United States Patent
Lu et al.

(10) Patent No.: US 11,630,777 B2
(45) Date of Patent: *Apr. 18, 2023

(54) PROVISIONING VIRTUAL MACHINES WITH A SINGLE IDENTITY AND CACHE VIRTUAL DISK

(71) Applicant: CITRIX SYSTEMS, INC., Fort Lauderdale, FL (US)

(72) Inventors: Yuhua Lu, Hollis, NH (US); Graham Macdonald, Bedford, NH (US); Simon Graham, Bolton, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,631

(22) Filed: Sep. 9, 2021

(65) Prior Publication Data

US 2021/0406186 A1 Dec. 30, 2021

Related U.S. Application Data

(63) Continuation of application No. 16/655,465, filed on Oct. 17, 2019, now Pat. No. 11,163,687.

(51) Int. Cl.
*G06F 12/00* (2006.01)
*G06F 12/0871* (2016.01)
(Continued)

(52) U.S. Cl.
CPC ...... *G06F 12/0871* (2013.01); *G06F 9/45558* (2013.01); *G06F 12/0868* (2013.01); *G06F 2009/45587* (2013.01); *G06F 2009/45591* (2013.01); *G06F 2212/151* (2013.01); *G06F 2212/224* (2013.01); *G06F 2212/281* (2013.01)

(58) Field of Classification Search
CPC ............ G06F 12/0871; G06F 12/0868; G06F 9/45558; G06F 2009/45591; G06F 2212/281; G06F 2212/151; G06F 2009/45597; G06F 2212/224
See application file for complete search history.

(56) References Cited

U.S. PATENT DOCUMENTS

| 8,209,680 B1 | 6/2012 | Le et al. |
| 2007/0050538 A1 | 3/2007 | Northcutt et al. |

(Continued)

FOREIGN PATENT DOCUMENTS

WO  2021076727 A1  4/2021

OTHER PUBLICATIONS

International Search Report and Written Opinion received for PCT Application No. PCT/US2020/055734 dated Jan. 15, 2021, 18 pages.
VMWARE,"Virtual Disk Configuration", 2019.

*Primary Examiner* — Arvind Talukdar

(57) ABSTRACT

A virtual disk is provided to a computing environment. The virtual disk includes identity information to enable identification of a virtual machine within the computing environment. A size of the virtual disk is increased within the computing environment to enable the virtual disk to act as a storage for the identity information and as a cache of other system data to operate the virtual machine. The virtual machine is booted within the computing environment. The virtual machine is configured to at least access the virtual disk that includes both identity information and caches other system data to operate the virtual machine. Related apparatus, systems, techniques and articles are also described.

20 Claims, 6 Drawing Sheets

(51) Int. Cl.
 *G06F 12/0868* (2016.01)
 *G06F 9/455* (2018.01)

(56) References Cited

U.S. PATENT DOCUMENTS

| | | |
|---|---|---|
| 2009/0260007 A1 | 10/2009 | Beaty et al. |
| 2011/0138147 A1 | 6/2011 | Knowles et al. |
| 2011/0185292 A1 | 7/2011 | Chawla et al. |
| 2013/0212593 A1 | 8/2013 | Baset et al. |
| 2014/0068610 A1 | 3/2014 | Baluch et al. |
| 2014/0143516 A1 | 5/2014 | Dawson et al. |
| 2014/0344504 A1 | 11/2014 | Luo et al. |
| 2015/0058555 A1 | 2/2015 | Karamanolis et al. |

PROVISIONING VIRTUAL MACHINES WITH A SINGLE IDENTITY AND CACHE VIRTUAL DISK

RELATED APPLICATIONS

This application is a continuation of and claims priority under 35 U.S.C. § 120 to U.S. application Ser. No. 16/655,465 filed on Oct. 17, 2019, the entire contents of which are incorporated herein by reference in their entirety.

TECHNICAL FIELD

The subject matter described herein relates to provisioning of virtual machines (VMs) with a single identity and cache virtual disk.

BACKGROUND

In computing, a virtual machine (VM) is an emulation of a computer system. Virtual machines are based on computer architectures and provide functionality of a physical computer. Their implementations may involve specialized hardware, software, or a combination.

Virtual machine provisioning, also sometimes referred to as virtual server provisioning, can include a systems management process that creates a new virtual machine within a physical host server and allocates computing resources to support the VM. A disk image can include a computer file containing the contents and structure of a disk volume or of an entire data storage device. A disk image can be made by creating a sector-by-sector copy of the source medium, thereby replicating the structure and contents of a storage device. In hardware virtualization, virtual machines implement virtual drives as part of their efforts to emulate the behavior of a physical computer. A virtual disk is a software component that emulates an actual disk storage device. A virtual machine provisioned within a cloud environment typically needs at least one virtual boot disk in order for the VM to boot. In some provisioning implementations, two additional virtual disks are used. The two additional virtual disks include at least one cache disk and at least one virtual identity disk to maintain machine identity.

SUMMARY

In an aspect, a virtual disk is provided to a computing environment. The virtual disk includes identity information to enable identification of a virtual machine within the computing environment. A size of the virtual disk is increased within the computing environment to enable the virtual disk to act as a storage for the identity information and as a cache of other system data to operate the virtual machine. The virtual machine is booted within the computing environment. The virtual machine is configured to at least access the virtual disk that includes both identity information and caches other system data to operate the virtual machine.

In some variations, one or more of the features disclosed herein including the following features can optionally be included in any feasible combination. For example, the virtual machine can be configured to expand a partition of the virtual disk and increase a file system volume in response to the booting to enable use of the virtual disk as the cache. The virtual machine can be further configured to reboot in response to expansion of the partition of the virtual disk. The reboot can activate cache drivers of the virtual machine. A virtual boot disk including a configuration of the virtual machine can be provided. The virtual disk can be attached to the virtual machine prior to the booting of the virtual machine and after increasing the size of the virtual disk. The identity information can uniquely identify the virtual machine within a virtual network of the computing environment. The virtual machine can access the virtual disk to store updates made to information contained within a virtual boot disk of the virtual machine, and the virtual machine can be configured to at least discard content of the virtual disk other than the identity information, in response to rebooting of the virtual machine. The upload of the virtual disk and the increase of the size of the virtual disk can be performed via an application programming interface of the computing environment. That the size of the virtual disk is less than a minimum required size for storing the cache and identity information can be detected. The computing environment can include a hypervisor controlling execution of the virtual machine.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Currently when provisioning some VMs, three virtual disks are required for each provisioned VM. These virtual disks include: a boot disk (which is identical for all VMs being cloned); an identity disk that includes a small amount of identity information but which otherwise contains a large amount of empty space; and a cache disk that is used to store changes to the boot disk and those changes are discarded upon reboot of the VM. But because the identity disk can include a small amount of data relative to its minimum required size (e.g., can include a large amount of unused space), provisioning a VM requiring three virtual disks can result in a significant waste of disk-space resources. For example, the identity information may include 32 kilobytes (KB) of information but the minimum allowed disk size can be, for example, 32 gigabytes (GB). This waste of resources can be readily apparent when provisioning large numbers of VMs. For example, when provisioning thousands of VMs, there may be terabtyes (TB) or more of disk space that is allocated but remains unused.

In addition, there is a limit to the quantity of virtual disks that are allowed within a given environment. Accordingly, when provisioning a large number of VMs, scalability is limited because each VM requires three disks, which can limit the number of allowed virtual machines for the given environment.

Accordingly, some implementations of the current subject matter include an approach to combining the identity disk and cache disk that can reduce the number required disks per provisioned VM from three to two and can eliminate the allocated but unused space on the identity disk. By combining the identity and cache disks, allocation of disk space that will never be used can be avoided. And combining the identity and cache disks can improve scalability allowing for more VMs.

In addition, some implementations can include combining the identity and cache within the target environment (e.g., a virtual infrastructure of the VM), which can enable a low time-to-provision the VM. Combining the identity and cache disks within the target environment avoids uploading of a disk that is large in size but mostly (or entirely) empty, such as would be the case if the combined identity and cache disk were uploaded as a single disk.

In other words, if the identity and cache disks were combined before uploading, other performance and scalability issues would occur because this approach would require uploading a relatively large sized disk that is mostly empty (e.g., mostly uploading 0's). Instead, in some implementations, the identity disk and cache disk can be combined by at least uploading the identity disk to a computing environment, expanding the identity disk size within the target environment, and configuring the VM to utilize the allocated but unused portion of the identity disk as the cache.

Figure 1:
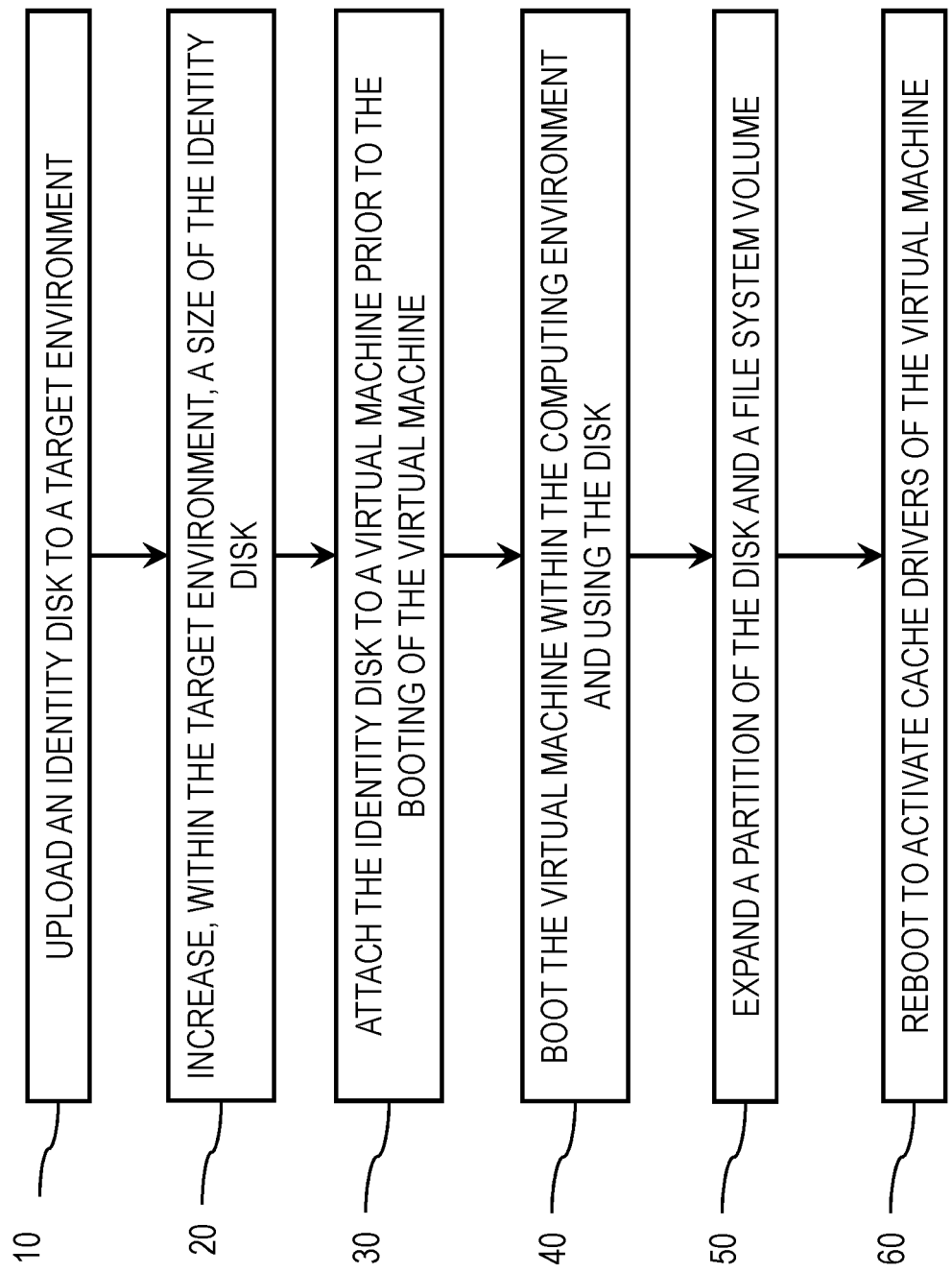
FIG. 1 is a flow diagram illustrating an example process of provisioning a virtual machine in which the identity and cache are combined into a single virtual disk that can increase scalability, reduce wasted-space resources, and without increasing time-to-provision.

FIG. 1 is a process flow diagram illustrating an example process of provisioning a virtual machine in which the identity disk and cache disk are combined into a single virtual disk that can increase scalability, reduce wasted-space resources, and without increasing time-to-provision.

At 10, an identity disk can be uploaded (e.g., provided) to a target environment. The identity disk can be a virtual disk such as a computer file that contains the data structure of a physical storage device. The identity disk can include identity information to enable identification of a virtual machine within the computing environment. For example, the identity information can uniquely identify the virtual machine within a virtual network of the target environment. Identity information can be utilized when creating many VMs from the same golden image but each instance of the VM needs its own unique identity. In some implementations, the identity information is relatively small (e.g., 32 kilobytes) compared to a required minimum disk size of the target environment (e.g., 32 gigabytes). For example, the identity disk can be created as a tiny virtual hard disk (VHD) file containing a formatted new technology file system (NTFS) partition and data files including identity metadata. The identity metadata can include, for example, a user assigned identity code (e.g., a name), a network identity such as an internet protocol (IP) address, a hash code, a universal unique identifier (UUID), and the like. In some implementations, a UUID can be based on a physical computer's identifier and a path to the virtual machine's configuration file.

The target environment can include a computing environment, for example, with VM infrastructure such as a hypervisor using native execution to share and manage hardware, allowing for multiple environments which are isolated from one another, yet exist on the same physical machine. The computing environment can include an infrastructure as a service (IaaS) platform that provides application programming interfaces (APIs) to dereference low-level details of underlying network infrastructure. In such an IaaS platform, pools of hypervisors can support large numbers of VMs and include the ability to scale up and down services to meet varying needs. IaaS platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

In some implementations, the identity disk can be uploaded to the target environment using application programming interface (API) calls of the target environment. In some implementations, the identity disk can be uploaded to the target environment from a remote computing system. The uploading can be performed relatively quickly as the identity disk is relatively small (e.g., as compared to a minimum required disk size of the target environment).

At 20, a size of the identity disk can be increased within the target environment. For example, the size of the identity disk can be increased from an initial size that is relatively small (e.g., 32 kilobytes), when compared to the required minimum disk size of the target environment, to a size that is equal to or greater than the minimum required disk size of the target environment (e.g., 32 gigabytes or greater). Increasing the size of the virtual identity disk within the target environment can enable the virtual identity disk to act as a storage for the identity information and as a cache of other system data to operate the virtual machine.

In some implementations, the identity disk can be increased within the target environment using application programming interface (API) calls of the target environment. Uploading a relatively smaller sized identity disk and then increasing the identity disk size within the target environment can avoid having to upload a larger sized identity disk (e.g., 32 gigabtyes or greater), which can maintain a low time-to-provision the VM.

In some implementations, the target environment can detect that the size of the virtual identity disk is less than a minimum required size for storing the cache and identity information. The detection may be performed, for example, by the target environment as part of an upload API call, which can include determining a size of the uploaded disk and comparing the size to a predetermined minimum disk size value. If the size of the uploaded disk is less than the predetermined minimum disk size value, it can be determined that the size of the virtual identity disk is less than the minimum required size. In some implementations, the minimum required size can be predetermined such as 16 GB, 32 GB, 64 GB, and the like. In response to detecting that the size of the virtual identity disk is less than a minimum required size for storing the cache and identity information, the size of the identity disk can be increased. The increasing can be performed, for example, using API calls of the target environment.

At 30, the identity disk can be attached to a virtual machine prior to booting of the virtual machine. Similarly, a boot disk (e.g., golden image) can be created from an uploaded boot disk image and attached to a virtual machine. The boot disk can include configuration settings of the VM and associated executable code such as cache drivers. The same boot disk image can be used for provisioning all VMs in a given set of VMs.

At 40, the VM can be booted within the target environment and using the identity disk. In some implementations, at this point, the volume in which to store identity information and defined by the partition of the identity disk is relatively small and there is a large amount of unused space on the disk. In some implementations, booting of the VM can cause the VM to execute code that configures the VM to access the identity disk and use the identity disk for the identity information contained within the disk as well as to use the disk as a cache disk to operate the VM. The cache portion of the disk can be used to store updates made to the boot disk during VM operation and the contents of the cache can be discarded on reboot to return the VM to an initial (e.g., clean) state.

Configuring the VM to utilize the identity disk as both an identity disk and as a cache can include, at 50, the VM expanding a partition of the disk and a file system volume of the disk. The file system volume (also sometimes referred to as a logical drive) can include a single accessible storage area with a single file system, which can be resident on a single partition of a hard disk. The VM can execute code that was previously provided to the target environment. For example, the code to expand the partition of the disk and increase the file system volume can be included in the boot disk. In some implementations, the code can include cache drivers. In some implementations, cache drivers are not activated at the initial boot of the VM because the cache disk is still too small (e.g., the partition has not yet been expanded). In this instance, the cache drivers can detect that the partition on the identity disk is smaller than the disk size and can use operating system API calls to expand the partition to the size of the virtual disk. The cache drivers can then also expand the NTFS volume on that partition to use all the space on the disk.

Configuring the VM to utilize the identity disk as both an identity disk and as a cache can include, at 60, rebooting the VM to activate cache drivers of the VM. The VM can execute code that was previously provided to the target environment (e.g., in the boot disk) in order to cause the reboot. The rebooting can be performed in response to the expansion of the partition of the virtual disk. The rebooting of the VM can configure cache drivers of the VM to utilize the virtual disk (which has now been increased in size, had its partition expanded, and increase the file system volume) as a cache.

Once configured to use a single virtual disk for both identity information and as a cache, the VM can operate normally. For example, the VM can access the virtual disk to store updates made to information contained within a virtual boot disk of the virtual machine. The VM can discard content of the virtual disk other than the identity information in response to rebooting of the virtual machine (e.g., to clear the cache and return the VM to an initial state). For example, in some implementations, the cache information is written to a virtual disk (VHDX) file located in the cache. The VHDX cache file can be deleted during normal shutdown, at system startup, and before activating the cache (in case the system was shut down unexpectedly). Deletion of the cache file can be performed at both startup and shutdown so that in normal operation the cache is not available when the VM is shut down and in the event of an unexpected shutdown, the cache file is deleted before the system can access the old data.

Figure 2B:
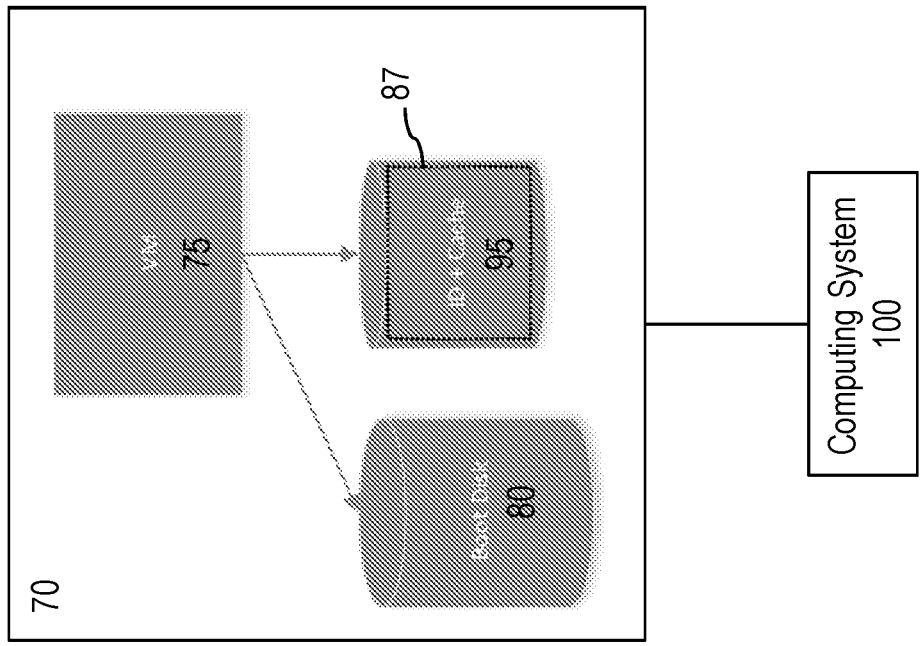
FIG. 2A-B illustrate system block diagrams of a system that can provision a virtual machine in which the identity and cache are combined into a single virtual disk that can increase scalability, reduce wasted-space resources, and without increasing time-to-provision.
Figure 2A:
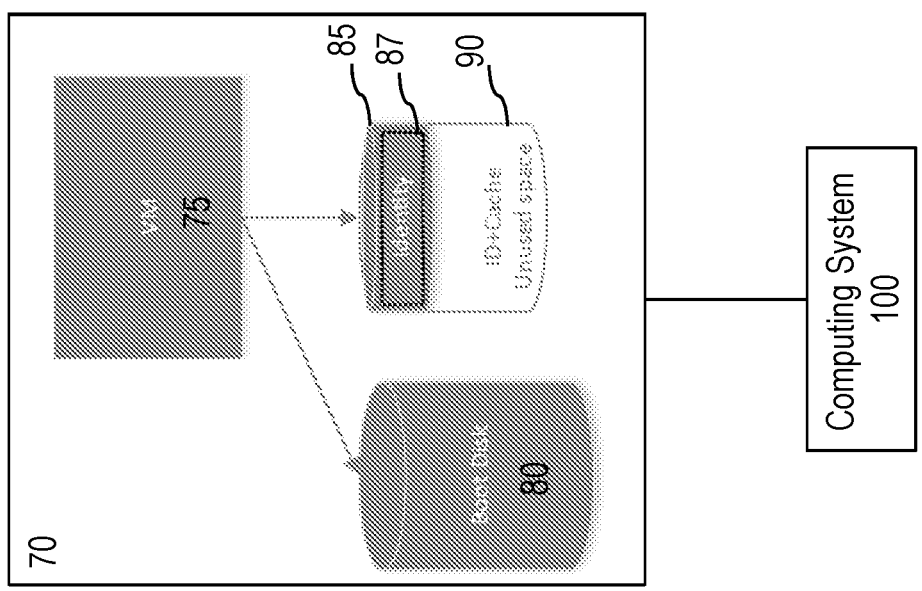

FIG. 2A-2B are system block diagrams illustrating an example target system 70 that is capable of provisioning a virtual machine in which the identity disk and cache disk are combined into a single virtual disk that can increase scalability, reduce wasted-space resources, and without increasing time-to-provision.

As illustrated in FIG. 2A, the target environment 70 includes at least one VM 75 with associated boot disk 80 and identity disk 85. The boot disk 80 can include (e.g., be implemented as) a VHD file containing a NTFS formatted partition and data files including VM configuration data including cache drivers. The identity disk 85 can include a VHD file containing a NTFS formatted partition 87 and data files including identity information. The boot disk 80 and identity disk 85 may have been provided by computing system 100 via API calls of the target environment 70. The target environment can include one or more computing systems such as virtualization server 301 (described more fully below with reference to FIG. 3), servers 106, and/or clients 102 (described more fully below with reference to FIGS. 4A-B). As described above with referenced to FIG. 1, the size of the identity disk 85 can be increased (the available increased portion illustrated at 90) but the identity disk 85 partition 87 remains small. The VM 75 can be booted by, for example, the computing system 100 and via API calls of the target environment 70. Booting of the VM 75 causes execution of cache drivers located on the boot disk 80, which expands the partition 87 and increases NTFS size of the identity disk 85 (as indicated by shaded area of disk 95 of FIG. 2B). The cache drivers also cause the VM 75 to reboot. After reboot, the VM 75 can operate, as illustrated in FIG. 2B, using the resulting combined identity and cache disk 95.

In some implementations, the subject matter described herein may provide technical advantages. For example, the current subject matter can provide for an approach that does not increase time-to-provision as a separate disk is not created. Scalability of systems utilizing the current approach can be increased by about a half (e.g., the maximum number of VMs a given target environment can support is increased by about a half). In addition, costs are reduced because wasted (e.g., unutilized) disk space is reduced, thereby reducing costs in the target environment.

For example, consider an environment that can support 6000 disks. If 3 disks are required per machine, at most 2000 machines can be provisioned. However, if only 2 disks are required per machine, 3000 machines can be provisioned, resulting in an increase in scalability of 50%.

Figure 3:
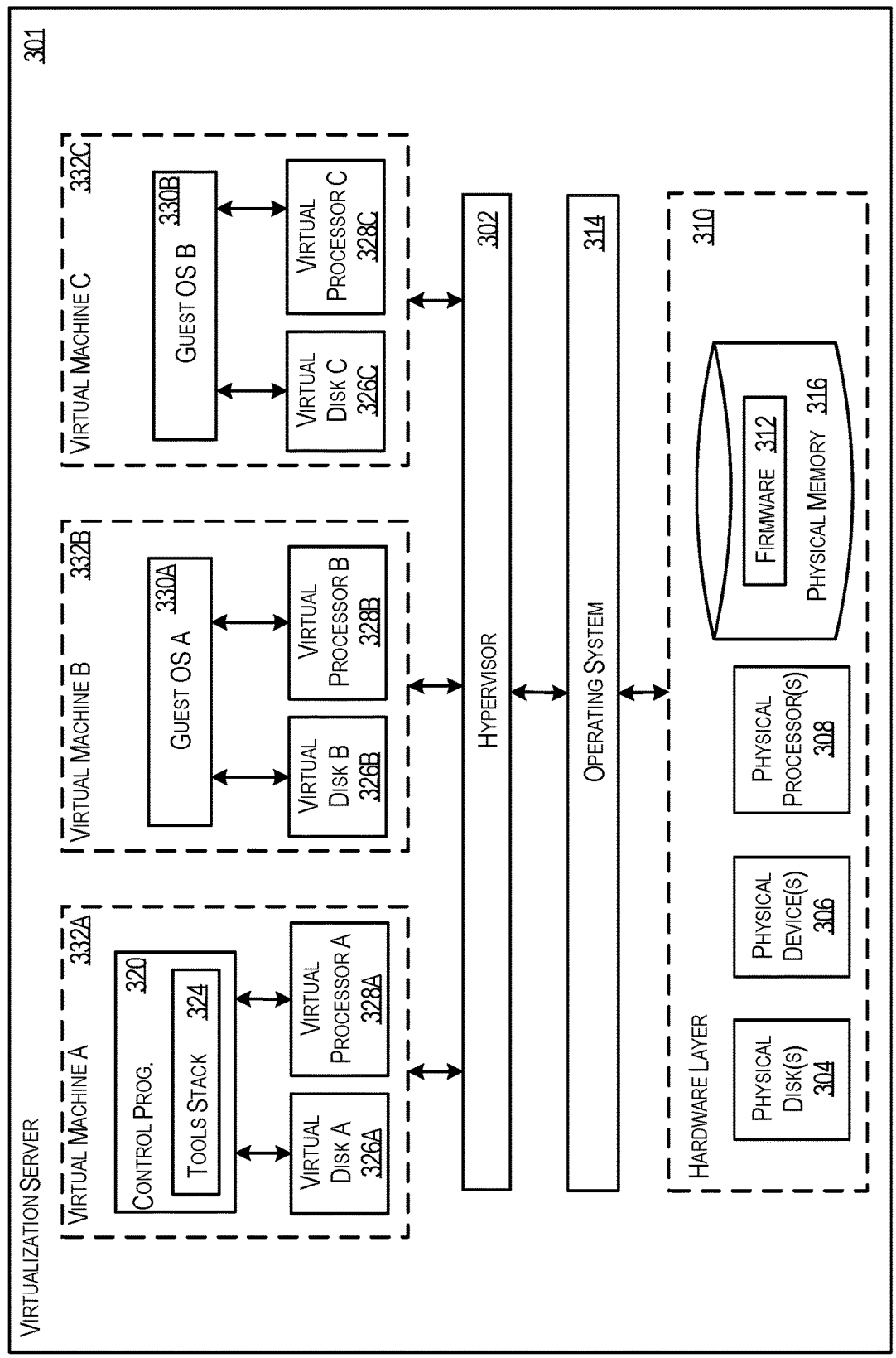
FIG. 3 shows a high-level architecture of an illustrative virtualization system that can enable provisioning a virtual machine in which the identity disk and cache disk are combined into a single virtual disk that can increase scalability, reduce wasted-space resources, and without increasing time-to-provision.

FIG. 3 shows a high-level architecture of an illustrative virtualization system that can enable provisioning a virtual machine in which the identity disk and cache disk are combined into a single virtual disk that can increase scalability, reduce wasted-space resources, and without increasing time-to-provision. As shown, the virtualization system may be a single-server or multi-server system, or a cloud system, including at least one virtualization server 301 configured to provide virtual desktops and/or virtual applications to one or more client access devices 102a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 3 may be deployed as and/or implemented by one or more embodiments of server 106 illustrated in FIG. 4A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332), which can include one or more embodiments of virtual machine 75 illustrated in FIG. 2. Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., a router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 3, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 3 illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

Figure 4A:
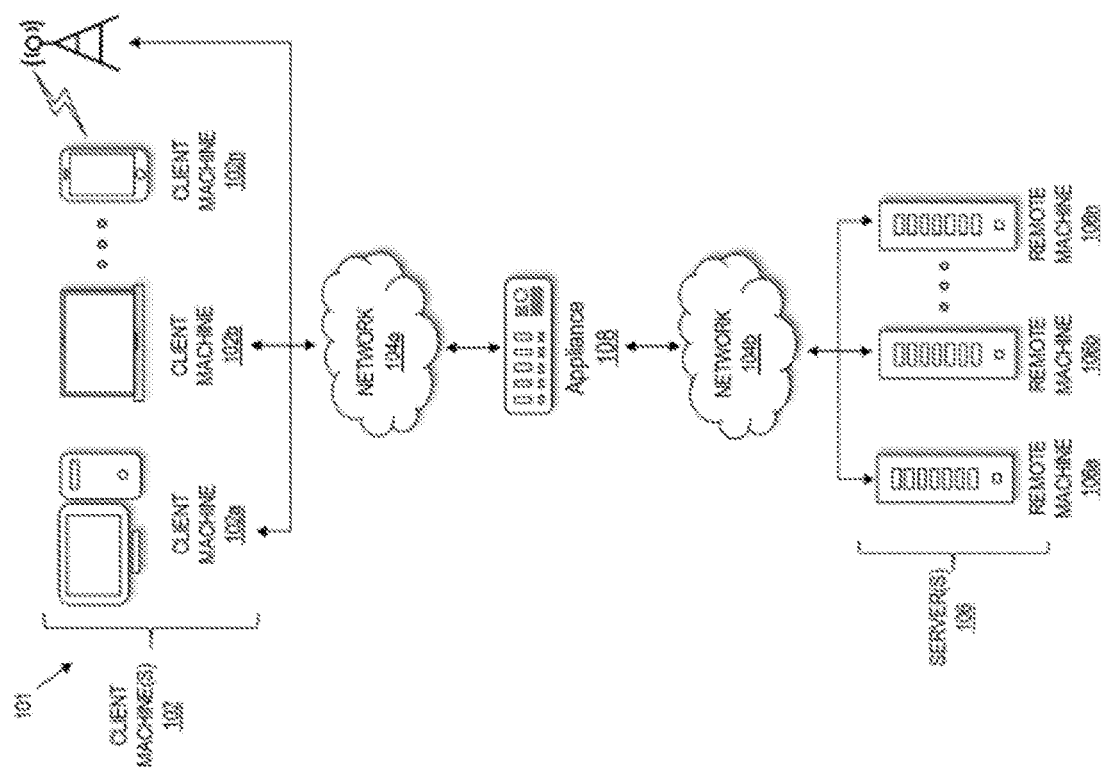
FIG. 4A depicts a network diagram illustrating an example of a network environment, in accordance with some example embodiments.

FIG. 4A depicts a network diagram illustrating an example of a network environment 10, that can enable provisioning of a virtual machine in which the identity disk and cache disk are combined into a single virtual disk that can increase scalability, reduce wasted-space resources, and without increasing time-to-provision. Referring to FIG. 4A, the network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can communicate with the remote machines 106a-106n via an appliance 108. The illustrated appliance 108 is positioned between the networks 104a and 104b, and can also be referred to as a network interface or gateway. The appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. Multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. The client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 can include, for example, the server 120, the proxy server 130, the resource server 140, and/or the like.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

The server 106 can execute a remote presentation services program or other program that uses a thin-client or a remote-display protocol to capture display output generated by an application executing on a server 106 and transmit the application display output to a client 102.

The server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106. The virtual machine can include any virtual machined provisioned with a combined identity and cache disk, for example, as described above with respect to FIGS. 1 and 2A-2B.

The network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 4B:
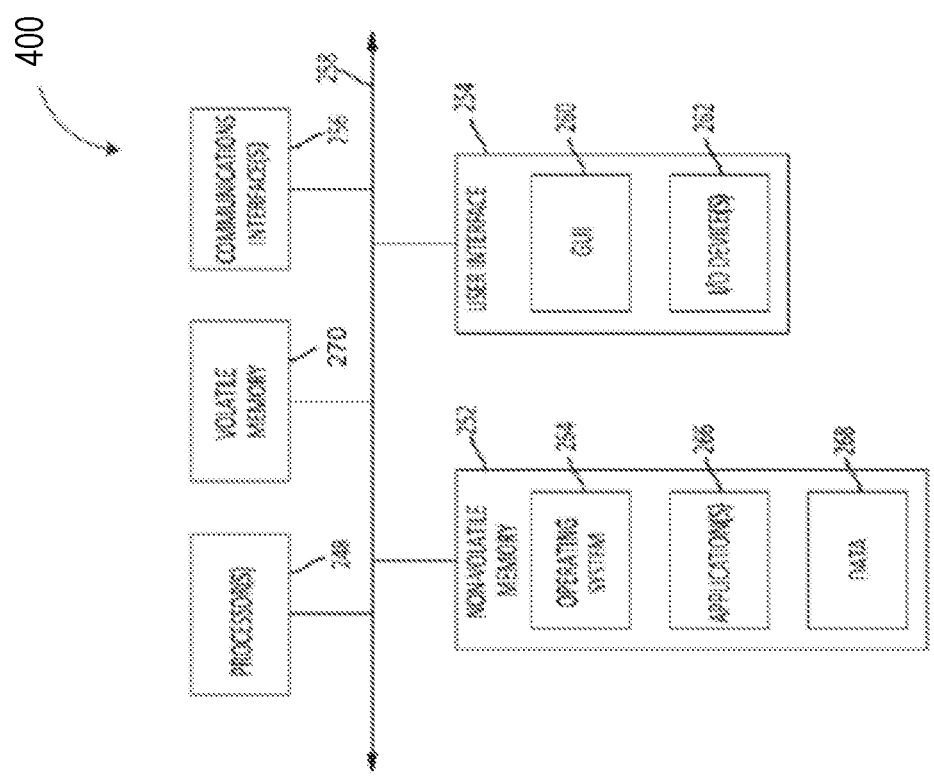
FIG. 4B depicts a block diagram illustrating an example of a computing device, in accordance with some example embodiments.

FIG. 4B depicts a block diagram illustrating an example of a computing device 400, in accordance with some example embodiments. Referring to FIGS. 4A-B, the computing device 400 can be useful for practicing an embodiment of the clients 102, the servers 106, and/or the appliances 108.

As shown in FIG. 4B, the computing device 400 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 400 can communicate via communication the bus 258. The computing device 400 as shown in FIG. 4B is shown merely as an example, as the clients 102, the servers 106, and the appliances 108 can be implemented by any computing or processing environment and with any type of machine or set of machines that can have suitable hardware and/or software capable of operating as described herein.

The computing device 400 can perform one or more parts of a VM provisioning process. For example, the computing device 400 can include the computing system 100 or the target environment 70 illustrated in FIGS. 2A-2B. For example, as part of a VM provisioning process, the computing device 400 can create copies of the boot disk, unique identity disks, upload the boot and identity disks to a target environment, and use API calls of the target environment to increase the identity disk sizes and boot respective VMs, for example, as described more fully above with respect to FIG. 1.

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 400 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 400 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Figure 5:
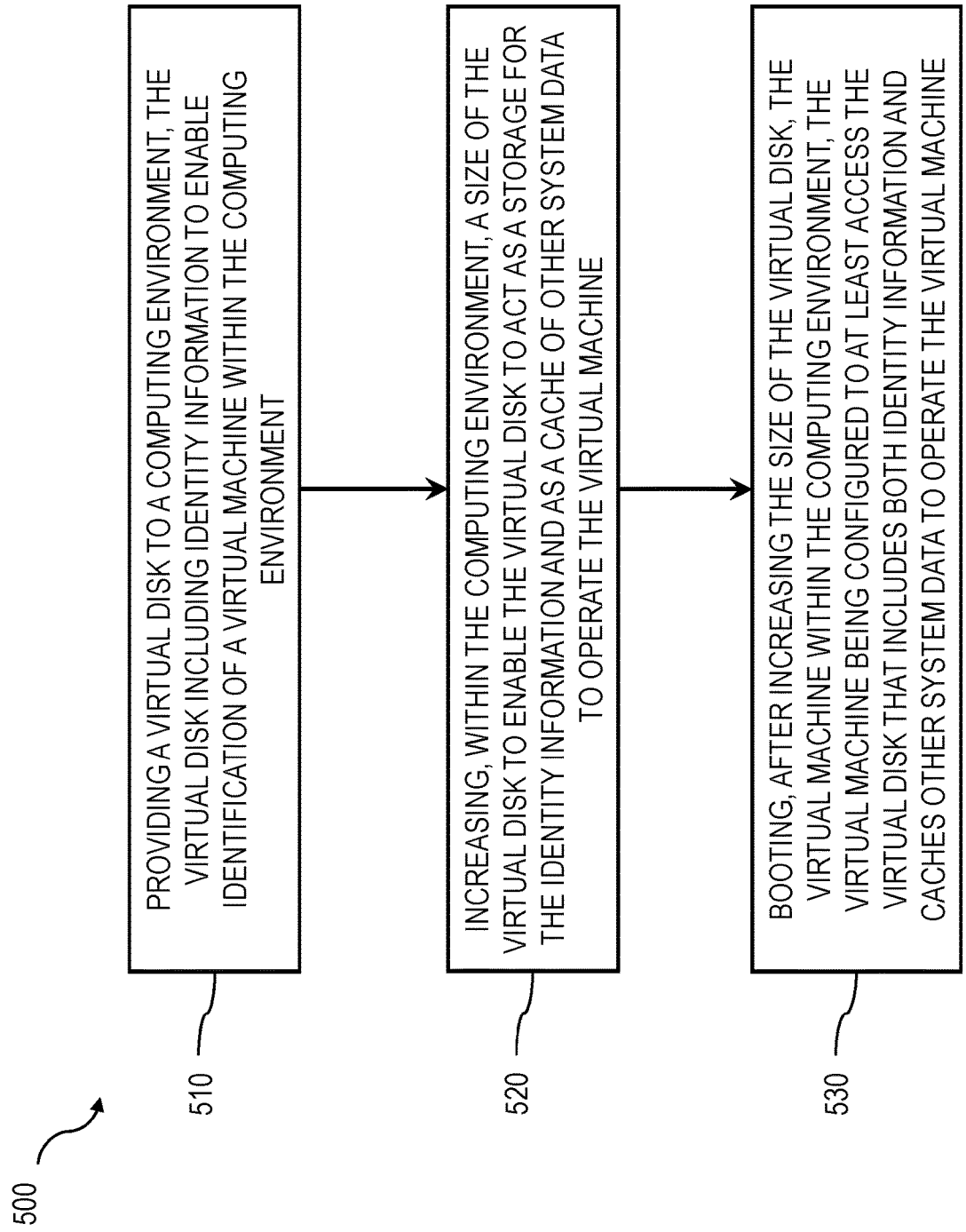
FIG. 5 is a flow diagram according to some implementations of the current subject matter.

FIG. 5 is a process flow diagram illustrating another example process of provisioning a virtual machine in which the identity disk and cache disk are combined into a single virtual disk that can increase scalability, reduce wasted-space resources, and without increasing time-to-provision.

At 510, a virtual disk is provided to a computing environment. The computing environment can include, for example, virtualization server 301 including hypervisor 302. The virtual disk can include identity information to enable identification of a virtual machine within the computing environment. For example, the virtual disk can include a VHD file containing a NTFS formatted partition and data files including identity information such as a user provided name, a UUID, an IP address, and the like.

At 520, a size of the virtual disk can be increased within the computing environment. For example, the virtualization server 301 can increase the size of the virtual disk to enable the virtual disk to act as a storage for the identity information and as a cache of other system data to operate the virtual machine. In some implementations the identity disk and a boot disk can be attached to the virtual machine.

At 530, the virtual machine is booted within the computing environment. The virtual machine can be booted by operating with hypervisor 302 and can include executing a boot disk including cache drivers. When booted, the cache drivers can cause an increase in the partition and a NTFS volume of the virtual disk. The cache drivers can cause a reboot of the VM. Upon reboot, the boot disk configures the VM to utilize the virtual disk for the identity information (e.g., by reading the VHD file) and as a cache. The VM can utilize the virtual disk as a cache by, for example, writing to a VHD file to store changes to the operating system by the VM.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
a processor; and
memory storing instructions which, when executed by the a processor, configures the processor to at least:
increase a size of a virtual disk, the virtual disk to store identity information of a virtual machine; and
boot, after increasing the size of the virtual disk, the virtual machine, the virtual machine to access the virtual disk for the identity information and to use the virtual disk to store data to operate the virtual machine.

2. The system of claim 1, wherein, in response to the booting, the virtual machine is configured by a virtual boot disk to expand a partition of the virtual disk.

3. The system of claim 2, wherein, in response to the booting, the virtual machine is configured by the virtual boot disk to increase a file system volume to enable use of the virtual disk as a cache.

4. The system of claim 2, wherein the virtual machine is further configured by the virtual boot disk to reboot in response to expansion of the partition of the virtual disk.

5. The system of claim 4, wherein the reboot activates cache drivers of the virtual machine.

6. The system of claim 2, wherein the processor and the memory storing instructions which, when executed by the processor, configures the processor to at least:
provide the virtual boot disk to a computing system, the virtual book disk including a configuration of the virtual machine.

7. The system of claim 1, wherein the processor and memory storing instructions which, when executed by the processor, configures the processor to at least:
provide the virtual disk to a computing system, wherein the providing and the increasing of the size of the virtual disk is performed via an application programming interface of the computing system.

8. The system of claim 1, wherein the virtual machine accesses the virtual disk to store updates made to information contained within the virtual boot disk of the virtual machine, and the virtual machine being configured to at least discard content of the virtual disk other than the identity information in response to rebooting of the virtual machine.

9. The system of claim 1, wherein the processor and the memory storing instructions which, when executed by the processor, configures the processor to at least:
attach the virtual disk to the virtual machine prior to the booting of the virtual machine and after increasing the size of the virtual disk.

10. The system of claim 1, wherein the identity information uniquely identifies the virtual machine within a virtual network of a computing system.

11. The system of claim 1, wherein the processor and the memory storing instructions which, when executed by the processor, configures the processor to at least:
   detect that the size of the virtual disk is less than a threshold size.

12. A method comprising:
   increasing a size of a virtual disk, the virtual disk to store identity information of a virtual machine; and
   booting, after increasing the size of the virtual disk, the virtual machine, the virtual machine to access the virtual disk for the identity information and to use the virtual disk to store data to operate the virtual machine.

13. The method of claim 12, wherein, in response to the booting, the virtual machine is configured by a virtual boot disk to expand a partition of the virtual disk.

14. The method of claim 13, wherein, in response to the booting, the virtual machine is configured by the virtual boot disk to increase a file system volume to enable use of the virtual disk as a cache.

15. The method of claim 13, wherein the virtual machine is further configured by the virtual boot disk to reboot in response to expansion of the partition of the virtual disk.

16. The method of claim 15, wherein the reboot activates cache drivers of the virtual machine.

17. The method of claim 13, further comprising:
   providing the virtual boot disk to a computing system, the virtual book disk including a configuration of the virtual machine.

18. The method of claim 12, further comprising:
   providing the virtual disk to a computing system, wherein the providing and the increasing of the size of the virtual disk is performed via an application programming interface of the computing system.

19. The method of claim 12, wherein the virtual machine accesses the virtual disk to store updates made to information contained within the virtual boot disk of the virtual machine, and the virtual machine is configured to at least discard content of the virtual disk other than the identity information in response to rebooting of the virtual machine.

20. A non-transitory computer program product which, when executed by a processor forming part of at least one computer, result in operations comprising:
   increasing a size of a virtual disk, the virtual disk to store identity information of a virtual machine; and
   booting, after increasing the size of the virtual disk, the virtual machine, the virtual machine to access the virtual disk for the identity information and to use the virtual disk to store data to operate the virtual machine.

* * * * *